United States Patent
Patterson et al.

(10) Patent No.: US 8,904,621 B2
(45) Date of Patent: Dec. 9, 2014

(54) TUBULAR CONNECTOR

(75) Inventors: Rowan Warwick Patterson, Beccles (GB); Matthew Marcantonio, Norwich (GB); Conor Patrick Leyden, Aberdeen (GB)

(73) Assignee: Claxton Engineering Services Limited (GB)

( * ) Notice: Subject to any disclaimer, the term of this patent is extended or adjusted under 35 U.S.C. 154(b) by 344 days.

(21) Appl. No.: 13/260,719

(22) PCT Filed: Mar. 26, 2010

(86) PCT No.: PCT/GB2010/050522
§ 371 (c)(1),
(2), (4) Date: Jan. 17, 2012

(87) PCT Pub. No.: WO2010/109251
PCT Pub. Date: Sep. 30, 2010

(65) Prior Publication Data
US 2012/0096700 A1    Apr. 26, 2012

(30) Foreign Application Priority Data
Mar. 27, 2009  (GB) .................................. 0905381.0

(51) Int. Cl.
*F16L 21/06* (2006.01)
*F16L 17/00* (2006.01)
(Continued)

(52) U.S. Cl.
CPC ....................................... *F16L 25/06* (2013.01)
USPC .......... 29/525.01; 29/237; 285/322; 285/323; 285/339; 285/342

(58) Field of Classification Search
USPC .............. 29/455.1, 525.01, 525.13, 237, 282, 29/283; 285/322, 323, 339, 342; 403/262, 403/337
See application file for complete search history.

(56) References Cited

U.S. PATENT DOCUMENTS
2,689,139 A * 9/1954 Jones et al. ................. 285/123.8
3,628,812 A * 12/1971 Larralde et al. ................. 285/24
(Continued)

FOREIGN PATENT DOCUMENTS
GB   2415473   12/2005
GB   2454526   5/2009
(Continued)

OTHER PUBLICATIONS
GB 2454526 A Search Report, mailed Mar. 7, 2008.
(Continued)

*Primary Examiner* — David Bryant
*Assistant Examiner* — Darrell C Ford
(74) *Attorney, Agent, or Firm* — Egan, Peterman & Enders LLP.

(57) ABSTRACT

The invention relates to a connector (1) for clamping a component around a tubular member (30) and to a method of using such a connector. The clamping connector (1) comprises a collar (2), a plurality of movable dogs (16) mounted in the collar and actuation means for driving the movement of the dogs. The collar (2) has an inner wall (4) and an outer wall 5, the inner wall being adapted to surround the tubular member (30) with a gap (56) between an outer surface of the inner wall (4) and an outer surface (28) of the tubular member. The inner wall (4) has a plurality of apertures (12) each aperture leading to a passage (14) through the inner wall. Each of the dogs (16) is slidably seated in one of the passages (14) for movement in a radial direction with respect to the tubular member (30). Around each passage (14) the inner wall (4) is spaced apart from an inner surface (25) of the outer wall (5). The actuation means includes a movable block (22) within the space (20) between the inner and outer walls (4, 5) and movement means (32) for moving the block in an axial direction with respect to the tubular member. Each block (22) has a radially outer surface (23) in sliding contact with the inner surface (25) of the outer wall (5) when each block is moved in the axial direction. Each block also has a radially inner surface (24) and each dog has a corresponding radially outer surface (26) that are in sliding contact with each other. At least one pair (24, 26) of these contacting sliding surfaces are oppositely inclined with respect to each other so that the relative axial movement of the block (22) and the dog (16) causes the dog to be driven in a radially inwardly direction across the gap (56) to grip the tubular member (30).

12 Claims, 7 Drawing Sheets

(51) Int. Cl.
*F16L 19/06* (2006.01)
*B23P 19/04* (2006.01)
*B23P 11/00* (2006.01)
*B23P 17/00* (2006.01)
*F16L 25/06* (2006.01)

(56) References Cited

U.S. PATENT DOCUMENTS

| | | | |
|---|---|---|---|
| 3,803,699 A * | 4/1974 | Rizzo | 29/237 |
| 4,115,016 A | 9/1978 | Muellenberg | |
| 4,196,914 A | 4/1980 | Kutman | |
| 4,496,172 A * | 1/1985 | Walker | 285/18 |
| 4,848,808 A | 7/1989 | Pannell | |
| 4,934,869 A * | 6/1990 | Brandon et al. | 405/199 |
| 4,957,313 A * | 9/1990 | MacIntyre et al. | 285/123.5 |
| 5,188,480 A | 2/1993 | Okuno | |
| 5,222,555 A * | 6/1993 | Bridges | 166/208 |
| 5,269,569 A * | 11/1993 | Weber et al. | 285/104 |
| 5,954,346 A * | 9/1999 | McLaren | 279/4.12 |
| 6,322,273 B1 | 11/2001 | Gentile, Jr. | |
| 6,471,439 B2 * | 10/2002 | Allamon et al. | 403/374.1 |
| 6,484,552 B1 * | 11/2002 | Bernas et al. | 72/402 |
| 6,609,734 B1 * | 8/2003 | Baugh | 285/322 |
| 6,698,800 B2 * | 3/2004 | Spiering et al. | 285/261 |
| 6,805,382 B2 * | 10/2004 | Jennings | 285/18 |
| 7,416,225 B2 * | 8/2008 | Williams | 285/341 |
| 7,431,349 B2 * | 10/2008 | Muller et al. | 285/339 |
| 7,614,453 B2 * | 11/2009 | Spiering et al. | 166/338 |
| 7,648,176 B2 * | 1/2010 | Van Bilderbeek | 285/95 |
| 7,677,602 B2 * | 3/2010 | Bennett et al. | 285/3 |
| 7,686,087 B2 * | 3/2010 | Pallini et al. | 166/367 |
| 7,815,225 B2 * | 10/2010 | Jones et al. | 285/339 |
| 7,837,238 B2 * | 11/2010 | Krausz et al. | 285/421 |
| 8,016,042 B2 * | 9/2011 | Spiering et al. | 166/338 |
| 8,235,427 B2 * | 8/2012 | Jones et al. | 285/339 |
| RE43,773 E * | 10/2012 | Duhn | 285/123.1 |
| 8,408,605 B2 * | 4/2013 | Curtiss | 285/327 |
| 2002/0101076 A1 * | 8/2002 | Barrier | 285/91 |
| 2003/0141718 A1 * | 7/2003 | Bilderbeek | 285/348 |
| 2003/0151254 A1 | 8/2003 | Baugh | 285/322 |
| 2006/0017287 A1 * | 1/2006 | Milberger | 285/412 |
| 2006/0244260 A1 * | 11/2006 | Longacre et al. | 285/337 |
| 2008/0111375 A1 * | 5/2008 | Bilderbeek | 285/330 |
| 2009/0014184 A1 * | 1/2009 | Voss et al. | 166/345 |
| 2010/0176588 A1 * | 7/2010 | Krausz et al. | 285/339 |
| 2012/0043757 A1 * | 2/2012 | Williams et al. | 285/339 |
| 2012/0104749 A1 * | 5/2012 | Kang | 285/323 |
| 2012/0168172 A1 * | 7/2012 | Litherland et al. | 166/367 |
| 2014/0033507 A1 * | 2/2014 | Kluss | 29/525.01 |

FOREIGN PATENT DOCUMENTS

| | | |
|---|---|---|
| JP | 2001021076 | 1/2001 |
| WO | WO 2009/015899 | 2/2009 |

OTHER PUBLICATIONS

GB 2468926 A Search Report, mailed Jul. 10, 2009.
International Preliminary Report on Patentability for PCT/GB2010/050522, mailed Jun. 27, 2011.
International Search Report for PCT/GB2010/050522, mailed Jul. 16, 2010.
Response to Written Opinion for PCT/GB2010/050522, mailed Jan. 12, 2011.
Written Opinion for PCT/GB2010/050522, mailed Jul. 16, 2010.

* cited by examiner

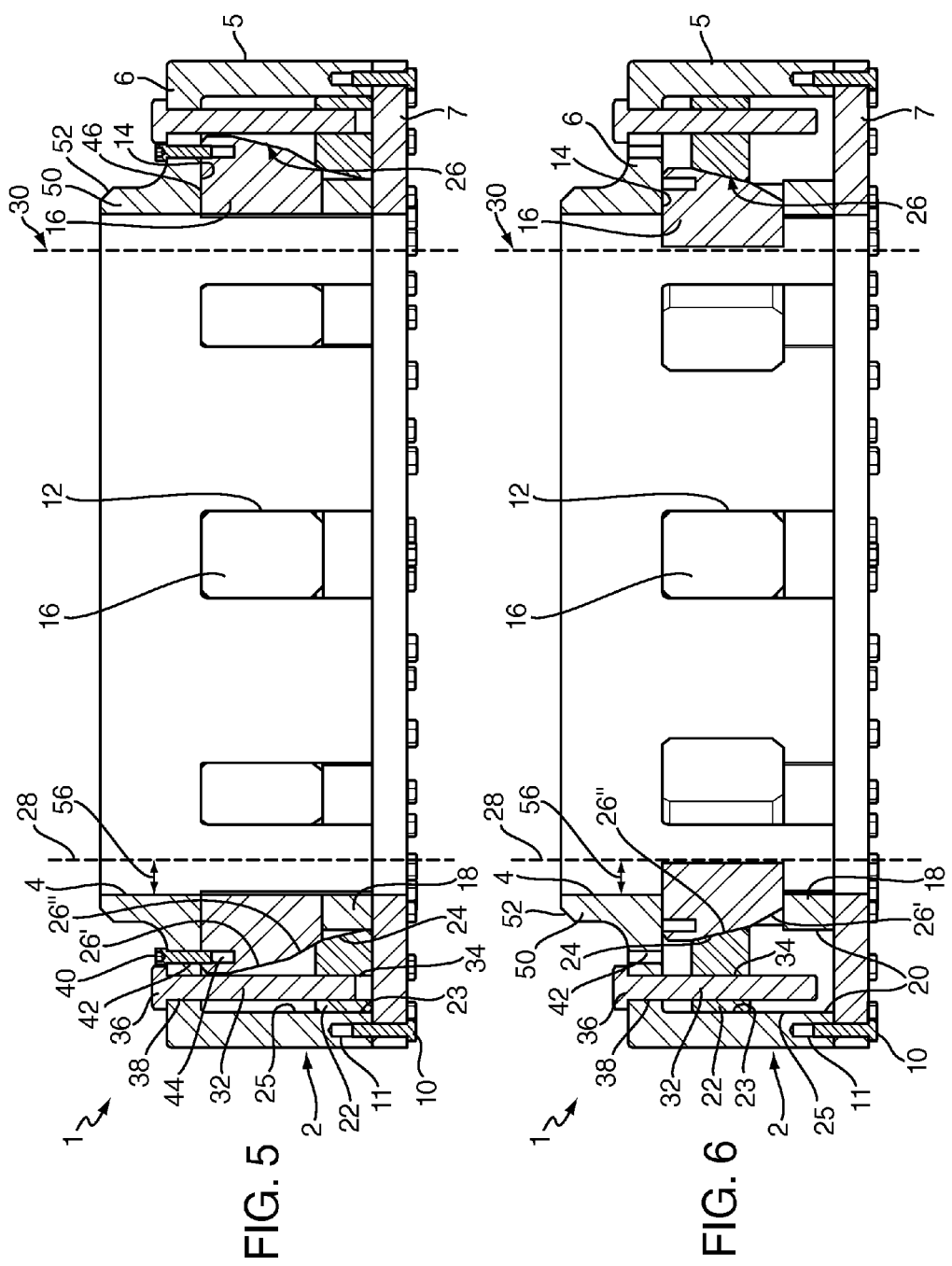

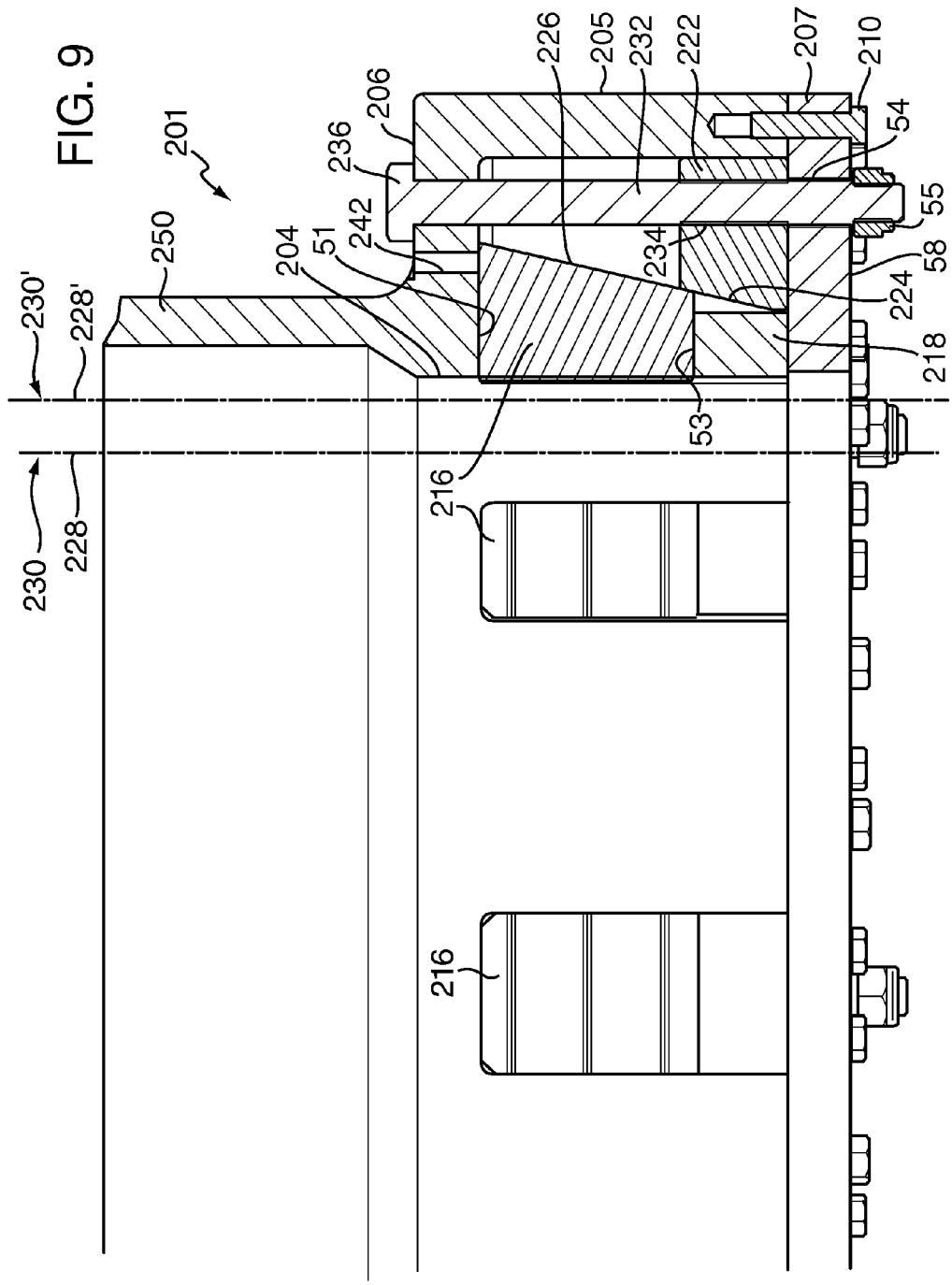

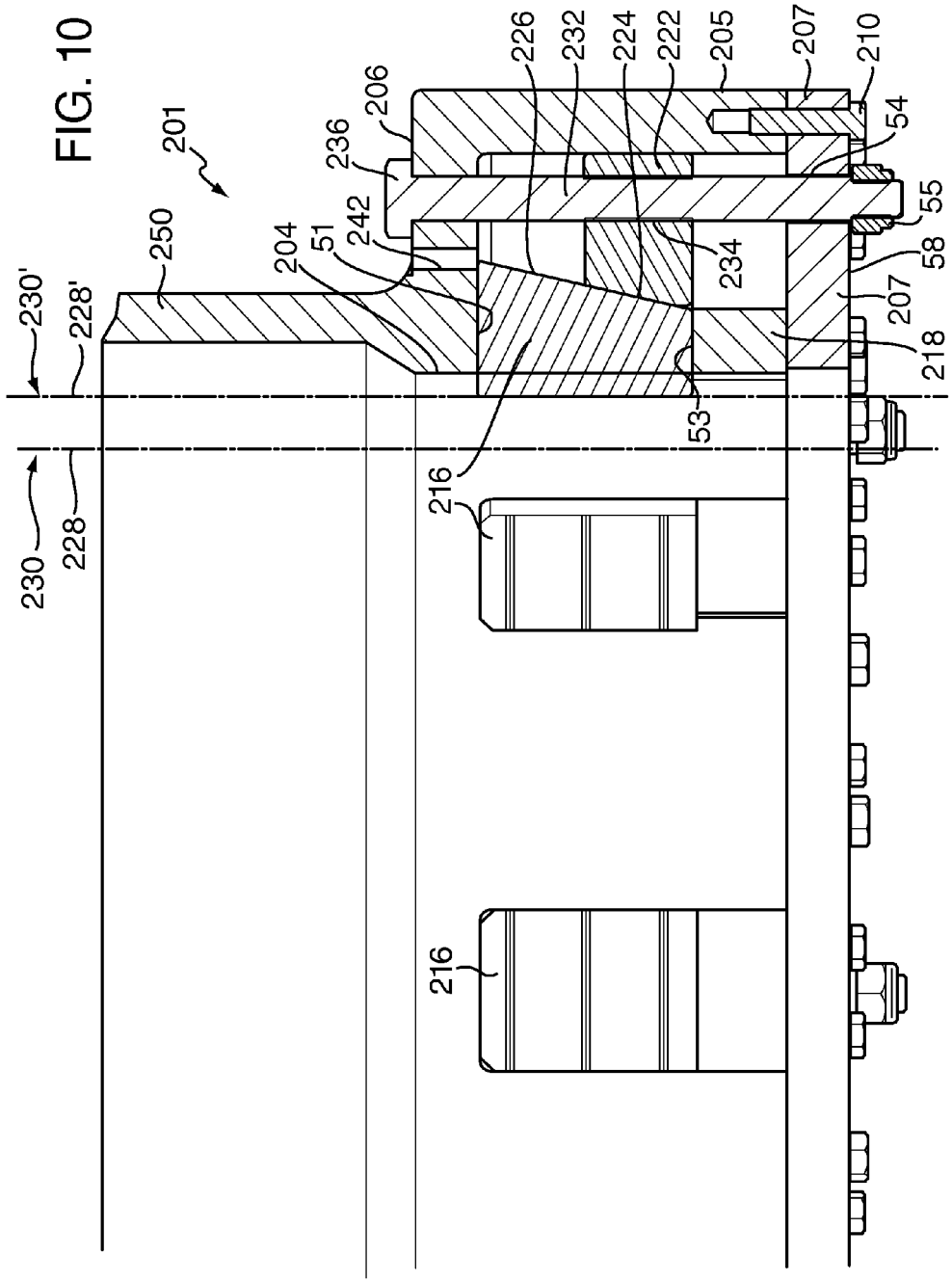

TUBULAR CONNECTOR

RELATED APPLICATIONS

This application is a national phase application under 35 U.S.C. §371 of International Application No. PCT/GB2010/050522, filed Mar. 26, 2010, which claims priority to GB Patent Application No. 0905381.0, filed Mar. 27, 2009, the contents of each of which are hereby incorporated by reference in their entirety.

BACKGROUND a. Field of the Invention

The invention relates to a connector for clamping a component around a tubular member and to a method of using such a connector.

b. Related Art

It is known to attach a component to a tubular pipe or the like by welding the component directly to the pipe wall or by welding a bracket or lug to the pipe wall and then attaching the component to the bracket or lug. However placing a weld on the pipe wall will always have the potential to interfere with the structural integrity of the pipe. If the pipe wall can be pierced, it may be possible to attach a component by passing a fastening through the pipe, but this also interferes with the strength of the pipe.

Various tubular connectors have therefore been proposed which can be affixed to the outer wall of a tubular pipe or the like by tightening a component of the connector to grip the outer wall of the pipe. The connector then provides a support or a fixing for a main component so that the main component is attached to or supported by the pipe wall. The use of such a connector therefore avoids welding or piercing the pipe wall, and also provides the possibility of being able to remove the connector if it is ever needed to disconnect the main component from the pipe.

Although many prior art designs of tubular connector have been proposed, many of these are quite complex mechanically, having spring based or hydraulic drive mechanisms to control the movement of an inwardly directed clamping member. Such devices are unsuited to use in marine environments being prone to corrosion over long periods of time or may be unnecessarily complicated when the connector may be expected only to be used once. Such connectors may also be unsuitable for scaling up to the dimensions that may be needed to join components of an offshore structure, for example a drilling or production platform, or for carrying massive loads.

It is an object of the present invention to provide a clamping connector for affixing to a tubular member, and also a method of using such a connector, that addresses these issues.

SUMMARY OF THE INVENTION

According to the invention, there is provided a clamping connector for affixing to a tubular member, the connector comprising a collar, a plurality of movable dogs mounted in the collar and actuation means for driving the movement of the dogs, wherein:

the collar has an inner wall and an outer wall, the inner wall being adapted to surround the tubular member with a gap between an outer surface of the inner wall and an outer surface of the tubular member;

the inner wall has a plurality of apertures each aperture leading to a passage through the inner wall;

each of said dogs is slidably seated in one of said passages for movement in a radial direction with respect to the tubular member;

around each passage the inner wall is spaced apart from an inner surface of the outer wall;

the actuation means includes a movable block within said space between the inner and outer walls, and movement means for moving the block in an axial direction with respect to the tubular member;

each block has a radially outer surface in sliding contact with the inner surface of the outer wall when each block is moved in the axial direction;

each block has a radially inner surface and each dog has a corresponding radially outer surface, said corresponding surfaces of each block and dog being in sliding contact; and at least one pair of said contacting sliding surfaces is oppositely inclined with respect to each other so that said relative axial movement of the block and the dog causes the dog to be driven in a radially inwardly direction across said gap to grip the tubular member.

Preferably, the contacting sliding surfaces of each block and dog are oppositely inclined, such that when the block is moved in an axial direction relative to the dog, the dog is driven in a radially inwardly direction across said gap to grip the tubular member.

In use, the contact between the block and the outer wall provides a restoring force to the gripping force transmitted radially outwards from the dog. The gripping force exerted by the dogs, which are preferably spaced circumferentially around the collar, then clamps the connector to the tubular member In a preferred embodiment of the invention, just one of the pairs of contacting sliding surfaces is oppositely inclined, namely the contacting sliding surfaces of each block and dog. The other pair of surfaces can then conveniently be oriented to lie in a plane or a cylindrical orientation that is parallel with the axial direction defined by the tubular member. The movement means can then also have movable components that lie parallel with the axial direction. This simplifies the construction of the connector.

In a preferred embodiment of the invention, the interface between each block and dog has two-stage inclination with an initial steep angle giving large movement and a relatively low gripping force and a second shallow angle giving small movement and relatively high gripping force.

This may be accomplished by providing sliding surfaces that have a first section and a second section, the first section having a first inclination relative to an axial direction with respect to the tubular member and corresponding with a first range of radial positions of the dog and the second section having a second inclination relative to an axial direction with respect to the tubular member and corresponding with a second range of radial positions of the dog. The first range is then radially outside the second range and the first inclination is greater than the second inclination.

Generally, the gap between the inner wall and outer wall of the tubular member will be an annular gap or an approximately annular gap. If the tubular member is predictably round and non-eccentric, then the movement means may be arranged to act uniformly on all of the blocks at the same time so that all the dogs move in concert to grip the tubular member.

It is, however, more often the case that the tubular member is not predictably round, having significant high and low radial points around its circumference. Therefore, it is advantageous if the movement means for each block is independent of the movement means for other blocks so that a plurality of blocks may be independently moved. Each corresponding dog is then independently driven in a radially inwardly direction across the gap, therefore accommodating large variations in pipe diameter and ovality.

The actuation means may be any convenient means for moving the block. In a preferred embodiment of the invention, the actuation means includes a threaded member, for example a bolt, which when turned, engages with a thread in the block to move the block in an axial direction. Other actuation means may, however be used, for example hydraulic actuation.

The collar may include radially extending plates or walls that extend between the inner wall and an outer wall and which define or limit the axial movement of the block. In one embodiment of the invention, the bolt extends through one of these plates or walls. In another embodiment, the bolt extends through both walls or plates.

The collar may have a pair of end walls that extend between the inner and outer walls. The threaded member of the actuation means then extends to an outer surface of at least one of these walls so that the threaded member may be engaged to turn the threaded member, for example by means of a bolt head.

The construction of the clamping connector is preferably such that the end walls tie the inner and outer walls together. For example, one of the end walls may be of unitary construction with the inner wall and outer wall.

A second end wall may then be removeably affixed to the inner and outer walls.

In a preferred embodiment of the invention, the clamping connector additionally comprises an activateable restraining means separate from the movement means, which, when activated, restrains the movement of the dogs so that the dogs remain in a retracted position relative to the tubular member. When the restraining means is deactivated the restraining means releases the dogs so that the dogs can be driven in a radially inwardly direction across said gap.

Also according to the invention, there is provided a method of affixing a clamping connector to a tubular member, the connector comprising a collar, a plurality of movable dogs mounted in the collar and actuation means for driving the movement of the dogs, the collar having an inner wall and an outer wall and the inner wall having a plurality of apertures each aperture leading to a passage through the inner wall and the actuation means including a movable block within a space between the inner and outer walls, and movement means for moving the block, wherein the method comprises the steps of:

placing the collar around a tubular member with a gap between an outer surface of the inner wall and an outer surface of the tubular member; and using the movement means to move the block in an axial direction with respect to the tubular member such that opposite surfaces of the block slide in contact with a radially inner surface of the outer wall and a radially outer surface of the dog, at least one pair of said contacting sliding surfaces being oppositely inclined with respect to each other so that said relative axial movement of the block and the dog causes the dog to be driven in a radially inwardly direction across said gap to grip the tubular member.

Conversely the sequence may be reversed such that the connection is disengaged.

BRIEF DESCRIPTION OF THE DRAWINGS

The invention will now be further described, by way of example only, and with reference to the accompanying drawings showing preferred embodiments of the invention, in which:

FIG. 5 is a cross-section through line V-V of FIG. 3;

FIG. 6 is a cross-section through line VI-VI of FIG. 4;

FIG. 9 is a partial cross-section through a clamping connector according to a third preferred embodiment of the invention, showing radially movable dogs in a retracted position;

FIG. 10 is a partial cross-section through the clamping connector of FIG. 9, showing the radially movable dogs in an extended position;

DETAILED DESCRIPTION

Figure 1:
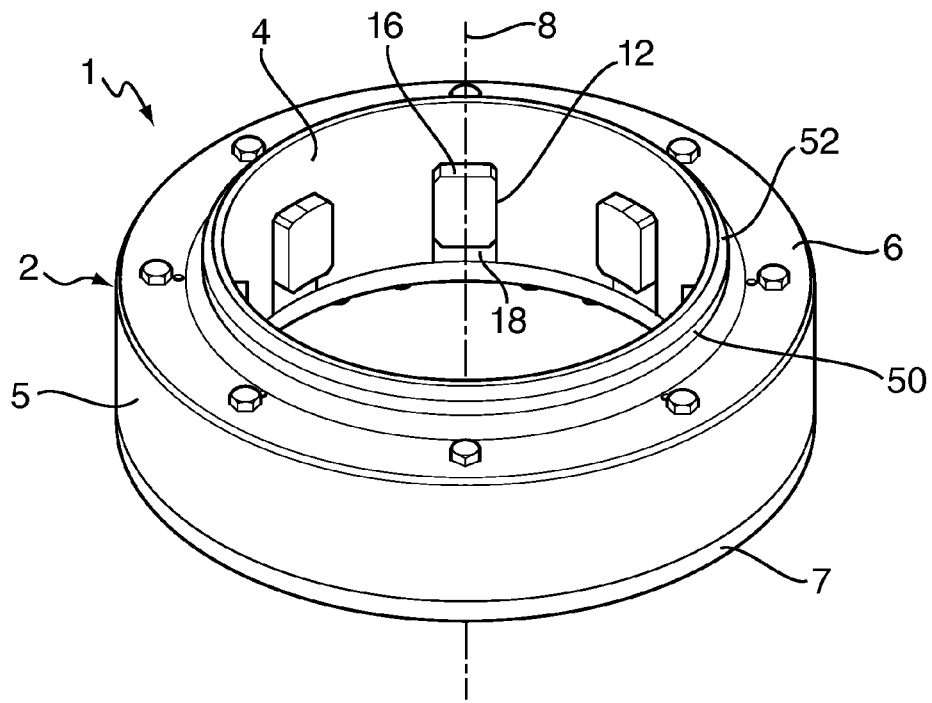
FIG. 1 is an isometric view of a clamping connector according to a first preferred embodiment of the invention, showing a collar having an inner wall and an outer wall and plurality of radially movable dogs extending through passages in the inner wall for clamping the connector to a tubular member, and having a cylindrical flange for making a welding connection to the collar.

FIGS. 1 to 6 show a first embodiment of a clamping connector 1 for affixing to a tubular member. The connector 1 has a main body portion in the form of a collar 2 that has a cylindrical inner wall 4, a cylindrical outer wall 5 concentric with the inner wall, an annular top wall 6 and an annular bottom wall 7 which is a plate removeably affixed to the inner and outer walls. The cylindrical inner and outer walls 4, 5 of the collar define a collar axis 8, with the top wall 6 and bottom plate 7 lying in parallel planes that are perpendicular to the collar axis.

The inner, outer and top walls 4, 5, 6 are integrally formed, being machined from a block of steel. The bottom plate 7 is bolted to the inner and outer walls 4, 5 by a series of bolts 10 that extend around the annular bottom plate and that engage in similarly threaded bores 11 in the inner and outer walls 4, 5. Together, the top and bottom walls tie the inner and outer walls of the collar together.

The inner wall 4 has a plurality of apertures 12 each of which leads to a passage 14 through the inner wall that extends in the radial direction. A first movable block 16 is held within each of the passages 14 and is slideable in the radial direction towards or away from the collar axis 8. Each passage has a rectangular cross-section that is defined on three sides by the surfaces machined in the inner wall 4 and on a third side nearest the bottom plate 7 by a fillet 18 of steel material that is bolted to the bottom plate 7. This simplifies the machining of the passage, which is completed by the fillet 18 when the bottom plate is bolted to the inner and outer walls 4, 5. The fillet 18 therefore fills in a portion of the inner wall directly beneath each of the first blocks 16.

The inner and outer walls 4, 5 are separated by a gap 20 in the vicinity of each aperture 12. This gap is spanned by a second movable block 22 that has flat inner and radially outer surfaces 23, 24 that are in sliding contact with, respectively, a radially inner surface 25 of the outer wall and flat outer surfaces 26 of the first movable block 16.

Figure 2:
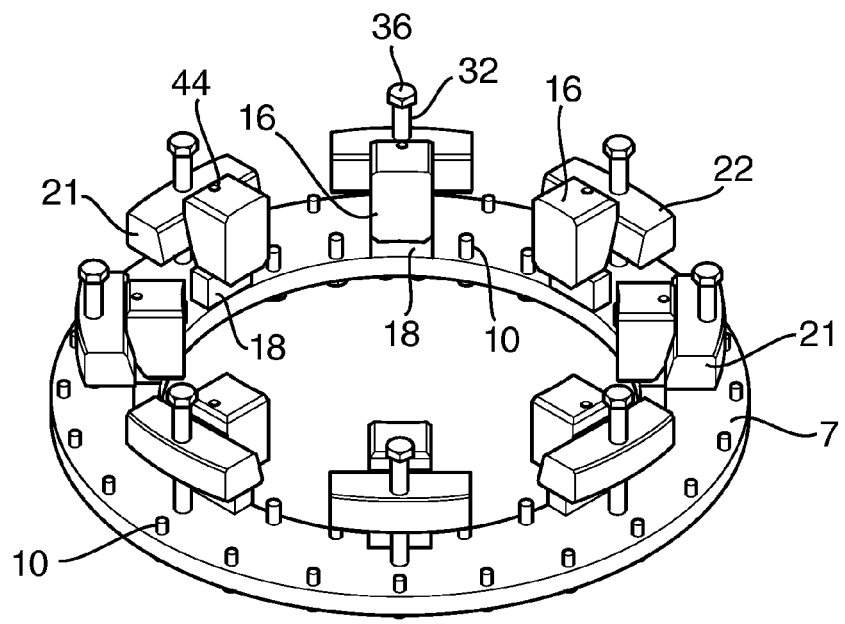
FIG. 2 is a cut away view of the clamping connector of FIG. 1 showing a base plate that extends between the inner and outer walls of the collar, and movement means for moving the dogs in a radially inwards direction.

As can be seen in FIG. 2 each of the second moveable blocks 22 extends circumferentially a greater extent than the first moveable block 16. Although not illustrated in a single drawing, this is so that projecting ends 21 of the second movable block can slide in a channel defined by the gap 20 that has the shape of an inverted square "U" between the inner and outer walls 4, 5. The inner surface of the inner wall is shaped in the regions of the projecting ends 21 of the second moveable block 22 so that this block makes a sliding fit with the internal surfaces of both the inner and outer walls 4, 5 to keep the second moveable block correctly aligned with respect to the first moveable block 16.

Both the first and second blocks 16, 22 are machined from steel and have a trapezoidal shape as viewed in a radially extending cross-section. The second block is slideable between the outer wall 5 and first movable block in an axial direction defined by the inner surface 25 of the outer wall 5, which extends concentrically with the collar axis 8. As can be seen from FIGS. 5 and 6, the contacting surfaces 26, 24 of the first and second movable blocks 16, 22 are oppositely inclined with respect to each other so that when the second block 22 is moved in an upwards axial direction, the first block is forced outwards through the passage 14 in a radially inwards direction. During this process, the inner surface 25 of the outer wall 5 prevents the second movable block 22 from moving in an outwards redial direction and so provides a restoring force to any resistance encountered by the movement of the first movable block 16 when this contacts an outer surface 28 of a tubular member 30. The first movable block therefore acts as a dog 16 and the second movable block acts as a driving block 22.

The driving block 22 is actuated by means of a threaded bolt 32 that engages with a similarly threaded bore 34 in the driving block 22. The bolt 32 and bore 34 each extend in a direction parallel with the collar axis 8 such that when the bolt is turned, the driving block is pulled or pushed in one or the other of the axial directions, while the axis of the bolt remains fixed. The bolt has a hexagonal head 36 that extends through a bore 38 in the top wall 6 so that the bolt may be gripped by suitable tools to turn the bolt.

The clamping connector 1 is designed mainly for single use, and for long lifetime in subsea conditions. The void 20 within the collar may be packed with grease to ensure smooth movement of the sliding blocks and to minimise the rate of corrosion. The number of parts in the moving mechanism is kept to a minimum to ensure reliability, both when the clamping connection to the tubular member is made, and when the connection is to be released, which could be after a period as long as 20 years.

Therefore, the clamping connector has no spring or hydraulic mechanism to control the movement of the dog 16 or to provide a retraction force to push the dog to a retracted orientation. The clamping connector does, however, have a restraining means which when activated secures each dog against radial movement. The restraining means is a series of securing bolts 40 each of which extends through a bore 42 in the top wall 6 that engages with a threaded bore 44 in a corresponding dog 16 to secure each of the dogs against movement radially inwards. The securing bolt when tightened pulls the driving block against an inner surface 46 of the top wall 6.

When the collar 2 is in place to be clamped to the tubular member 30, the securing bolts 40 are first removed, and then each clamping bolt 32 is turned to drive the dogs 16 against the outer surface 28 of the tubular member 30.

As can be seen from FIGS. 5 and 6, the radially outer inclined surface 26 of the dog 16 has sections 26', 26" so that the angle of the sliding contact and between the oppositely inclined surfaces of the driving block 22 and dog 16 varies as the block is moved in an axial direction. As a result, the amount the dog 16 is driven in a radially inwardly direction towards the tubular member 30 for a given movement of the block 22 in an axial direction varies as the dog is driven radially inwards.

A first section 26' of the inclined surface 26 nearest the bottom plate 7 is initially contacted by the driving block 22 and a second section 26" nearest the top wall is latterly contacted by the driving block 22 as this is moved axially upwards in the void 20 in order to drive the dog 16 radially inwards. The amount the dog is driven in a radially inwardly direction for a given movement of the block in an axial direction is therefore reduced as the dog is driven radially inwards. This provides the advantage of closing the expected gap 56 with the tubular member 30 initially quickly, while maximising the mechanical advantage and hence the gripping pressure from the dogs when the gap 56 is closed and the dogs are pressed against the outer surface 28 of the tubular member 30.

The clamping connector 1 has a fixing means in the form of a cylindrical flange 50 by which a main component may be affixed to the clamping connector in order to affix the main component to the tubular member 30 when the clamping connector is affixed to the tubular member. The cylindrical flange 50 is an extending portion of the collar 2 that is flush on an inner side with the inner wall 4, for making a butt weld with another component, which may be another tubular component or any other type of component that can be welded to the clamping connector. The cylindrical flange 50 is integrally formed at the junction between with the top and inner walls 6, 4.

To aid the welding process, the free end of the flange has a chamfered outer edge 52. In use, this weld will normally be made prior to clamping of the connector 1 to the tubular member 30, but such a weld may of course alternatively be made after the clamping connector 1 has been clamped to the tubular member 30.

Figure 7:
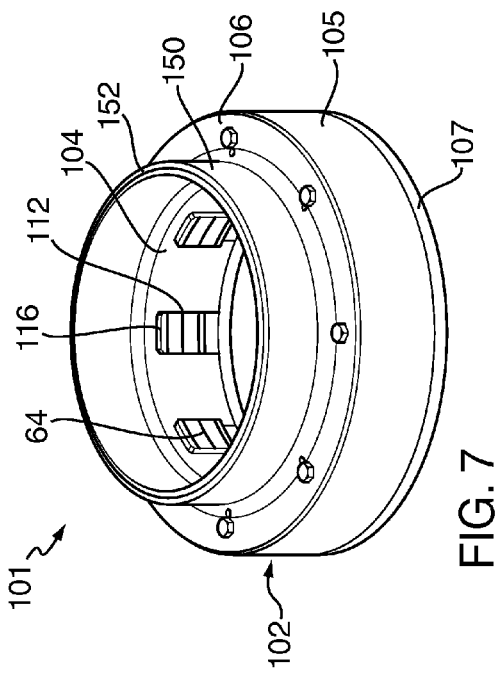
FIG. 7 is an isometric view of a clamping connector according to a second preferred embodiment of the invention, similar to the first embodiment but having an axially extended cylindrical flange for making a welding connection to the collar.
Figure 8:
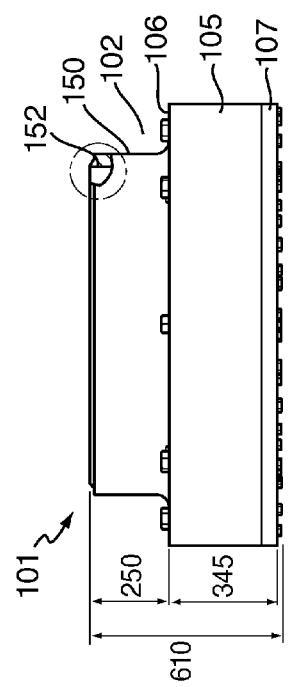
FIG. 8 is a side view of the clamping connector of FIG. 7.
Figure 13:
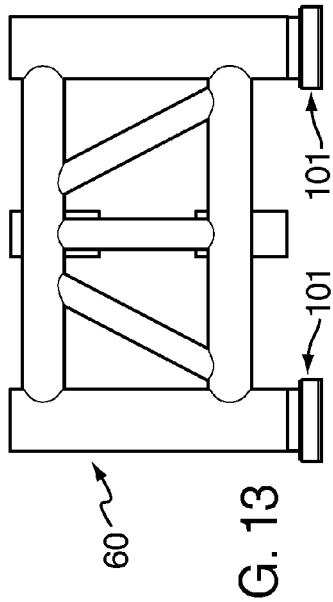
FIGS. 12 and 13 are side views and FIG. 14 is a top view of the structure of FIG. 11.
Figure 11:
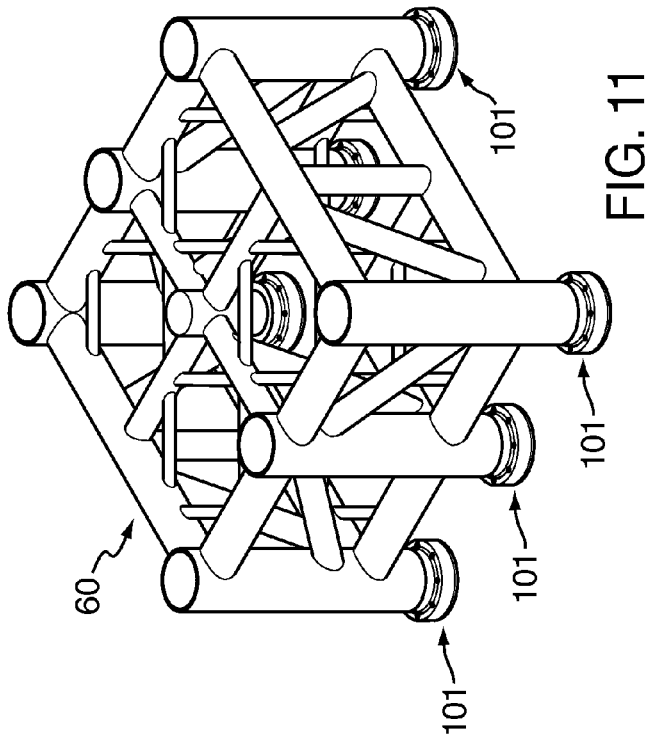
FIG. 11 is an isometric view of a structure having a plurality of vertical tubular frame members each of which has welded at its lower end a clamping connector according to the invention for connection to an underwater tubular member.
Figure 12:
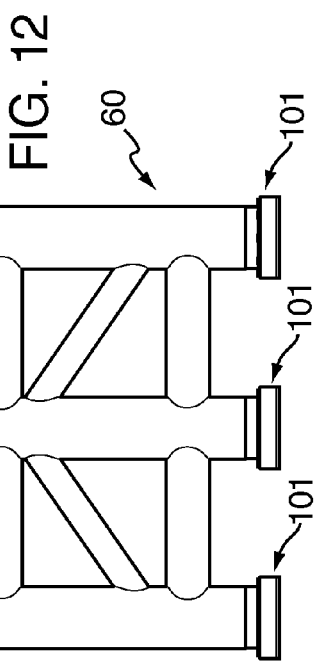
Figure 14:
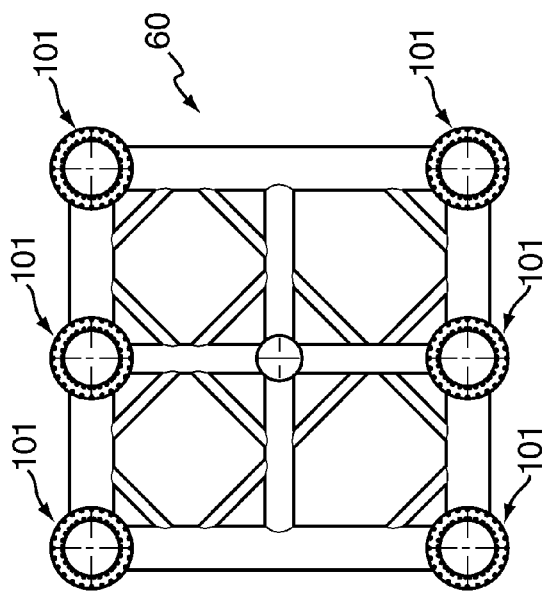

FIGS. 7 and 8 show a second embodiment of a clamping connector 101 in which features similar to those of the first embodiment 1 are indicated by reference numerals incremented by 100. The second embodiment 101 differs from the first embodiment 1 in that the cylindrical flange 150 extends for over a longer axial distance. Otherwise, the construction and use is the same as that described above.

FIGS. 9 and 10 show a third embodiment of a clamping connector 201 in which features similar to those of the first embodiment 1 are indicated by reference numerals incremented by 200. The second embodiment 201 has the same extended flange portion 250 as the second embodiment, but otherwise differs from the first and second embodiments 1, 101 as follows.

Securing bolts (not shown) do not engage with a threaded bore on the dog 216, but rather bear down on a top surface 51 of the dog 216. A bottom surface 53 of the dog 216 is therefore pushed against the fillet 218 which secures the dog against radial movement prior to use.

In this embodiment, the radially outer surface 226 of the dog 216 is flat so that the dog moves a set amount in or out of the passage 214 for a given axial movement imparted to the driver block 222 by the threaded bolt 232. This embodiment may therefore be used with tubular members 230, 230' having outer surfaces 228, 228' with a greater range of maximum outer diameters, as indicated by the two dashed lines in the drawings.

However the most significant difference is that the threaded bolt 232 extends through a bore 54 in the bottom plate 207. After the dogs 216 have been driven to engage with the outer surface 228, 228' of the tubular member 230, 230', a nut 55 is threaded over the bolt 232 where this projects through the bore 54. The nut 55 is then tightened against an outer surface 58 of the bottom plate 207 to secure the bolt 232 against any further rotational movement. In this way, the dogs 216 are secured against any relaxation against the tubular member 230, 230'.

Otherwise, the construction and use is the same as that described above.

FIGS. 11 to 14 show various views of a drilling platform structure 60 having a plurality of vertical tubular frame members each of which has butt welded at its lower end a clamping connector. In this example, the clamping connector is according to the second embodiment of the invention 101, but either of the other two embodiments of clamping connector 1, 201 could be used in place of this. The clamping connector 101 once welded to each of the vertical tubular frame members permits connection to a similar array of vertically extending underwater tubular members (not shown).

To help resist corrosion, the external surfaces of the clamping connector 1, 101, 201 may be coated with a suitable corrosion protective coating and a cathodic protection system such as anodes attached.

Figure 15:
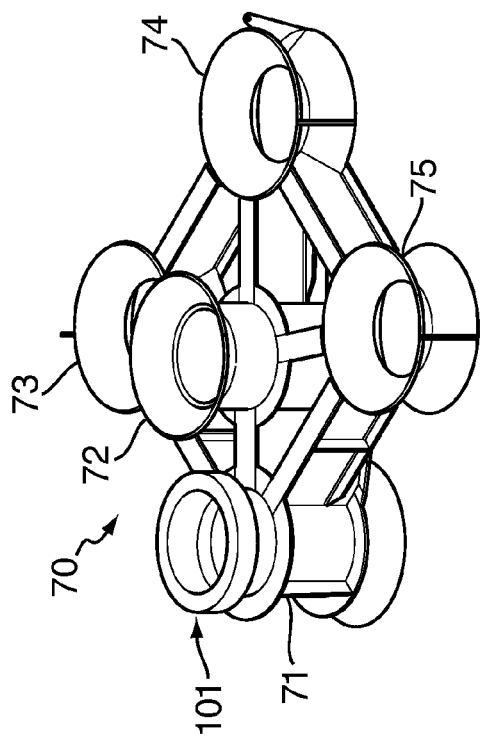
FIG. 15 is an isometric view of a conductor supported drilling template, having a plurality of guide funnels, with a clamping connector according to the invention welded to the top of one funnel for connection to a seabed conductor pipe.
Figure 16:
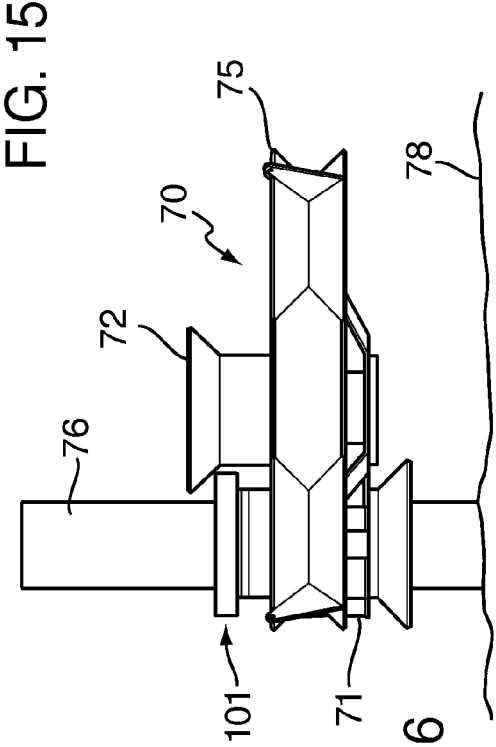
FIG. 16 shows a side view and FIG. 17 shows a top view of the drilling template when clamped to a seabed conductor pipe.
Figure 17:
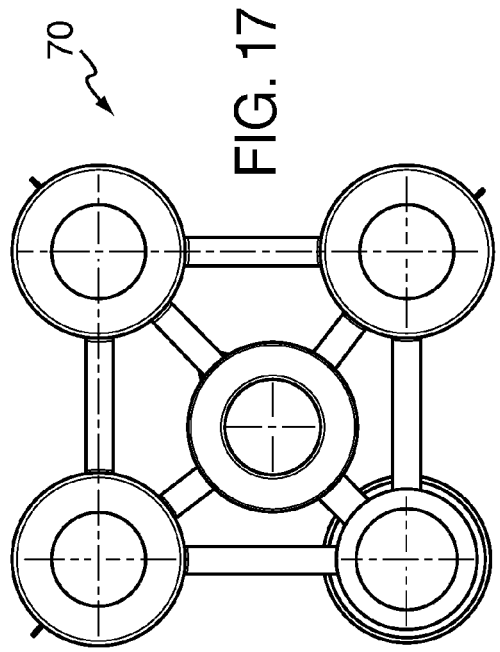

FIGS. 15 to 17 show two views of a conductor supported drilling template 70, having a plurality of guide funnels 71 to 75, with a clamping connector. In this example, the clamping connector 101 is according to the second embodiment of the invention, but either of the other two embodiments of clamping connector 1, 201 could be used in place of this. The clamping connector 101 is butt welded to the top of one funnel 71 for connection to a tubular member in the form of a seabed conductor pipe 76. The other funnels then form a drilling template when clamped to the conductor pipe 76 extending vertically from the seabed 78.

Figure 3:
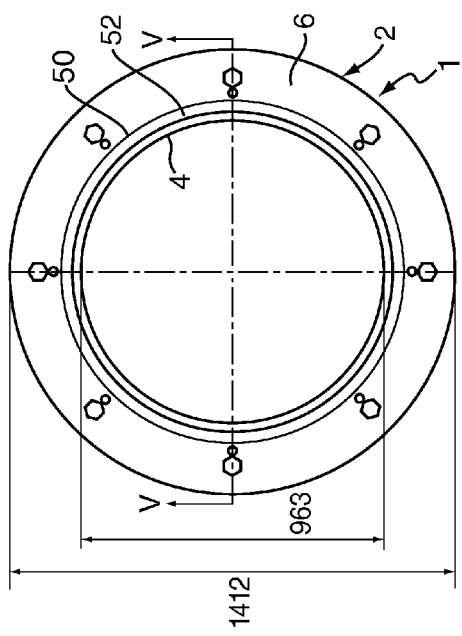
FIGS. 3 and 4 are views from above of the clamping connector of FIG. 1, showing respectively the dogs in radially retracted and extended orientations.
Figure 4:
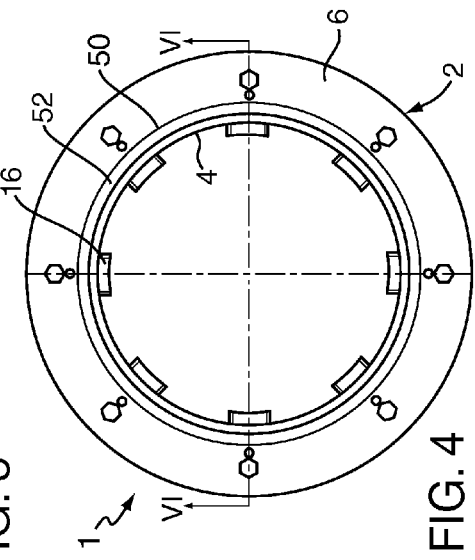

The overall dimensions of the three embodiments of the clamping connector 1, 101, 201 are the same, with the exception of the different cylindrical flange portions 50, 150, 250 and are given in millimeters on FIGS. 3 and 8. The thickness of the walls is in the region of 5-10 mm. Each dog preferably has circumferentially extending gripping ridges 64 in a cylindrical surface concentric with the axis 8 to improve the grip against the tubular member 30, 230. In use, each clamping connector can support an underwater weight of about 300 tonnes when clamped to a tubular member such as a subsea riser, that is approximately 3 feet (914 mm) in diameter. Such tubular members may be slightly oval with a deviation from circularity of up to about ±1.5% and with a tolerance on nominal diameter of about ±1.0%.

The invention therefore provides a convenient clamping connector for affixing to a tubular member.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention, as defined by the appended claims.

The invention claimed is:

1. A clamping connector for affixing to a tubular member, the connector comprising a collar, a plurality of movable dogs mounted in the collar and a plurality of separate actuation means, one for each of said dogs for driving the movement of the dogs, wherein:

the collar has a collar axis and a radially inner wall and a radially outer wall, the inner wall being adapted to surround the tubular member with a gap between an outer surface of the inner wall and an outer surface of the tubular member;

the inner wall has a plurality of apertures, each aperture leading to a passage through the inner wall;

each of said dogs is slidably seated in one of said passages for movement in a radial direction with respect to the tubular member;

around each passage the inner wall is spaced apart from an inner surface of the outer wall;

each of said actuation means comprises a movable block within said space between the inner and outer walls, and movement means for moving the block in an axial direction with respect to the tubular member;

each block has a radially outer surface in sliding contact with the inner surface of the outer wall when each block is moved in said axial direction;

each block has a radially inner surface and each dog has a radially outer surface, said inner and outer surfaces of each corresponding block and dog being in sliding contact with each other when each block is moved in said axial direction relative to the corresponding dog;

said contacting sliding surfaces of each corresponding block and dog are oppositely inclined with respect to each other such that said relative axial movement of the block and the dog causes each corresponding dog to be driven in said radially inwardly direction across said gap towards said outer surface of the tubular member;

the movement means for each block is independent of the movement means for other blocks so that said plurality of blocks may, in use, be independently moved in said axial direction so that each corresponding dog is independently driven in said radially inwardly direction across said gap to grip said outer surface of the tubular member; and each block is contained between the inner and outer walls of the collar and has projecting ends that extend circumferentially a greater extent than the corresponding dog, said projecting ends making a sliding fit with both the inner and outer walls of the collar to keep each of said blocks correctly aligned with respect to the corresponding dog as each block is moved in said axial direction.

2. A clamping connector as claimed in claim 1, in which the actuation means includes a threaded member which when turned, engages with a thread in the block to move the block in said axial direction and the collar has a pair of end walls that extend between the inner and outer walls, and the threaded member of the actuation means extends to an outer surface of at least one of said walls so that the threaded member may be engaged to turn the threaded member.

3. A clamping connector as claimed in claim 2, in which the end walls tie the inner and outer walls together.

4. A clamping connector as claimed in claim 1, in which the collar has at least one end wall that extends between the inner and outer walls including a first end wall that is of unitary construction with the inner wall and outer wall.

5. A clamping connector as claimed in claim 4, including a second end wall that extends between the inner and outer walls, the second end wall being removeably affixed to the inner and outer walls.

6. A clamping connector as claimed in claim 1, comprising additionally an activateable restraining means separate from the movement means and which, when activated, restrains the movement of the dogs so that the dogs remain in a retracted position relative to the tubular member, and which when deactivated releases the dogs so that the dogs can be driven in said radially inwardly direction across said gap.

7. A method of affixing a clamping connector to a tubular member, the connector comprising a collar, a plurality of movable dogs mounted in the collar and a plurality of separate actuation means, one for each of said dogs for driving the movement of the dogs, the collar having a collar axis and a radially inner wall and a radially outer wall and the inner wall having a plurality of apertures, each aperture leading to a passage through the inner wall and each of said actuation means comprising a movable block and movement means for moving the block, the movement means for each block being independent of the movement means for other blocks and each movable block having projecting ends that extend circumferentially a greater extent than the corresponding dog and each block being contained within a space between the inner and outer walls, wherein the method comprises the steps of:
    placing the collar around a tubular member with a gap between an outer surface of the inner wall and an outer surface of the tubular member;
    using each movement means to independently move each corresponding block in an axial direction with respect to the tubular member such that opposite surfaces of the block slide in contact with, respectively, a radially inner surface of the outer wall and a radially outer surface of the dog, at least one pair of said contacting sliding surfaces of the block and dog being oppositely inclined with respect to each other so that said relative axial movement of the block and the dog causes the dog to slide along said passage as the dog is driven in said radially inward direction across said gap towards said outer surface of the tubular member; and
    using a sliding fit of said projecting ends with both the inner and outer walls of the collar to keep each of said blocks correctly aligned with respect to the corresponding dog as each block is moved in said axial direction.

8. A clamping connector for affixing to a tubular member, the connector comprising a collar, a plurality of movable dogs mounted in the collar, a plurality of separate actuation means, one for each of said dogs for driving the movement of the dogs, and an activateable restraining means for restraining the movement of the dogs, wherein:
    the collar has a collar axis and a radially inner wall and a radially outer wall, the inner wall being adapted to surround the tubular member with a gap between an outer surface of the inner wall and an outer surface of the tubular member;
    the inner wall has a plurality of apertures each aperture leading to a passage through the inner wall;
    each of said dogs is slidably seated in one of said passages for movement in a radial direction with respect to the tubular member;
    around each passage the inner wall is spaced apart from an inner surface of the outer wall;
    each of said actuation means comprises a movable block within said space between the inner and outer walls, and movement means for moving the block in an axial direction with respect to the tubular member;
    each block has a radially outer surface in sliding contact with the inner surface of the outer wall when each block is moved in said axial direction;
    each block has a radially inner surface and each dog has a radially outer surface, said inner and outer surfaces of each corresponding block and dog being in sliding contact with each other when each block is moved in said axial direction relative to the corresponding dog;
    said contacting sliding surfaces of each corresponding block and dog are oppositely inclined with respect to each other such that said relative axial movement of the block and the dog causes each corresponding dog to be driven in said radially inwardly direction across said gap towards said outer surface of the tubular member; and
    the activateable restraining means is separate from the movement means and when activated prior to affixing of the clamping connector to the tubular member restrains the movement of the dogs so that the dogs remain in a retracted position relative to the tubular member, and when deactivated releases the dogs so that the dogs can be driven by the movement means in said radially inwardly direction across said gap to grip the outer surface of the tubular member.

9. A clamping connector as claimed in claim 8, in which the restraining means includes a plurality of individual threaded members, each of which when turned engages with a thread in a corresponding dog to lock said dog in place to prevent said radial movement of said dog.

10. A clamping connector as claimed in claim 9, in which the collar has at least one end wall that extends between the inner and outer walls, and the threaded member of the restraining means extends to an outer surface of said end wall so that the threaded member of the restraining means may be engaged to turn the threaded member.

11. A clamping connector as claimed in claim 8, in which the movement means for each block is independent of the movement means for other blocks so that said plurality of blocks may be independently moved so that each corresponding dog is independently driven in said radially inwardly direction across said gap to grip said outer surface of the tubular member.

12. A method of affixing a clamping connector to a tubular member, the connector comprising a collar, a plurality of movable dogs mounted in the collar a plurality of separate actuation means, one for each of said dogs for driving the movement of the dogs, and an activateable restraining means separate from the movement means for restraining the movement of the blocks, the collar having a collar axis and a radially inner wall and a radially outer wall and the inner wall having a plurality of apertures, each aperture leading to a passage through the inner wall and each of said actuation means comprising a movable block and movement means for moving the block, wherein the method comprises the steps of:
    placing the collar around a tubular member with a gap between an outer surface of the inner wall and an outer surface of the tubular member;

prior to affixing of the clamping connector to the tubular member, activating the restraining means to restrain the movement of the dogs so that the dogs remain in a retracted position relative to the tubular member and then deactivating the restraining means to release the dogs so that the dogs can be driven by the movement means in a radially inwardly direction across said gap; and using each movement means to move each corresponding block in an axial direction with respect to the tubular member such that opposite surfaces of the block slide in contact with, respectively, a radially inner surface of the outer wall and a radially outer surface of the dog, at least one pair of said contacting sliding surfaces of the block and dog being oppositely inclined with respect to each other so that said relative axial movement of the block and the dog causes the dog to slide along said passage as the dog is driven in said radially inward direction across said gap towards said outer surface of the tubular member.

* * * * *